(12) United States Patent
Weiss et al.

(10) Patent No.: US 9,895,650 B2
(45) Date of Patent: Feb. 20, 2018

(54) METHOD AND DEVICE FOR OBTAINING GAS PRODUCTS

(75) Inventors: Horst Weiss, Munich (DE); Alexander Brandl, Munich (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 547 days.

(21) Appl. No.: 14/130,114

(22) PCT Filed: Jun. 14, 2012

(86) PCT No.: PCT/EP2012/002516
§ 371 (c)(1),
(2), (4) Date: Feb. 6, 2014

(87) PCT Pub. No.: WO2013/004335
PCT Pub. Date: Jan. 10, 2013

(65) Prior Publication Data
US 2014/0190350 A1    Jul. 10, 2014

(30) Foreign Application Priority Data

Jul. 1, 2011   (DE) ........................ 10 2011 107 814

(51) Int. Cl.
*B01D 53/14* (2006.01)
*B01D 53/18* (2006.01)
*C01B 3/52* (2006.01)

(52) U.S. Cl.
CPC ......... *B01D 53/18* (2013.01); *B01D 53/1406* (2013.01); *B01D 53/1425* (2013.01);
(Continued)

(58) Field of Classification Search
CPC .... B01D 2252/2021; B01D 2252/2026; B01D 53/1406; B01D 53/1425; B01D 53/1462;
(Continued)

(56) References Cited

U.S. PATENT DOCUMENTS 3,824,766 A * 7/1974 Valentine ........... B01D 53/1462
95/163
4,198,388 A * 4/1980 Laslo ................. B01D 53/1412
261/23.1
(Continued)

FOREIGN PATENT DOCUMENTS

EP         0290913 A2    11/1988

OTHER PUBLICATIONS

International Search Report from PCT/EP2012/002516 dated Sep. 26, 2012.

*Primary Examiner* — Cabrena Holecek
(74) *Attorney, Agent, or Firm* — Millen White Zelano & Branigan, PC

(57) ABSTRACT

The invention relates to a method and to a device for physical gas scrubbing, wherein a feed gas (1) containing hydrogen, carbon monoxide, carbon dioxide and also carbonyl sulphide and/or hydrogen sulphide is conducted through a first scrubbing section (W1) in countercurrent to a scrubbing medium preloaded with carbon dioxide, in order to separate sulphur components substantially selectively off from the feed gas and to generate a desulphurized gas mixture (3). In a second scrubbing section, carbon dioxide is separated off from only a subquantity of the desulphurized gas mixture by scrubbing with an unloaded scrubbing medium (4) and the resultant carbon dioxide-preloaded scrubbing medium is used completely in the first scrubbing section (W1) as scrubbing medium.

13 Claims, 1 Drawing Sheet

(52) U.S. Cl.
CPC ............ *B01D 53/1462* (2013.01); *C01B 3/52* (2013.01); *B01D 2252/2021* (2013.01); *B01D 2252/2026* (2013.01); *Y02C 10/06* (2013.01); *Y02P 20/152* (2015.11)

(58) Field of Classification Search
CPC ........... B01D 53/18; C01B 3/52; Y02C 10/06; Y02P 20/152
See application file for complete search history.

(56) References Cited

U.S. PATENT DOCUMENTS

| | | | |
|---|---|---|---|
| 4,242,108 A * | 12/1980 | Nicholas | B01D 53/1462 95/166 |
| 4,568,364 A * | 2/1986 | Galstaun | B01D 53/14 95/176 |
| 4,938,783 A | 7/1990 | Ranke et al. | |
| 6,139,605 A | 10/2000 | Carnell et al. | |
| 8,460,436 B2 | 6/2013 | Baburao et al. | |
| 2010/0083696 A1* | 4/2010 | Hoang-Dinh | B01D 53/1425 62/611 |
| 2011/0120309 A1 | 5/2011 | Baburao et al. | |
| 2012/0063980 A1* | 3/2012 | Kortunov | B01D 53/1475 423/229 |
| 2013/0251601 A1 | 9/2013 | Baburao et al. | |

\* cited by examiner

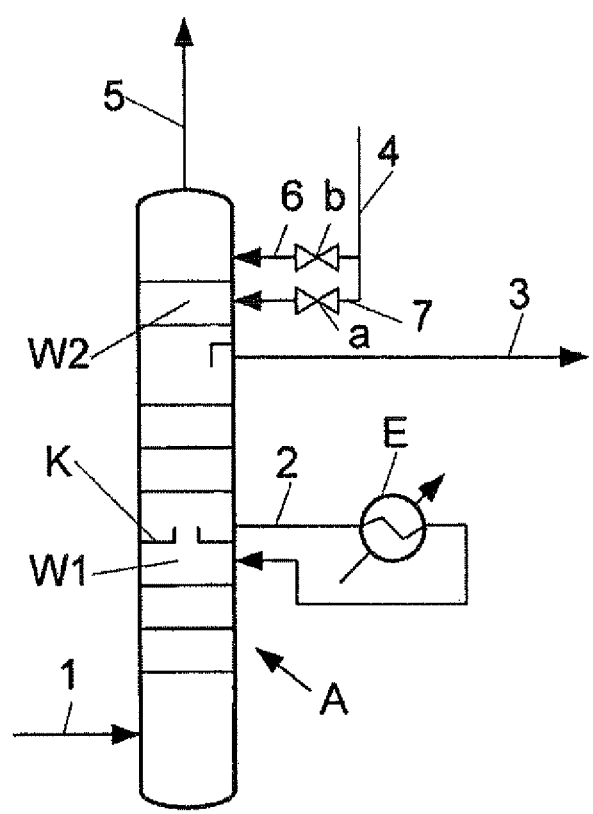

METHOD AND DEVICE FOR OBTAINING GAS PRODUCTS

The invention relates to a method for physical gas scrubbing, wherein a feed gas containing hydrogen, carbon monoxide, carbon dioxide and also carbon oxide sulfide and/or hydrogen sulfide is directed through a first scrubbing section in counterflow to a scrubbing medium which is preladen with carbon dioxide in order to generally selectively separate sulfur components from the feed gas and to produce a desulfurized gas mixture.

The invention furthermore relates to a device for implementing the method.

Methods of the generic type have been known from the prior art for a long time and known to the person skilled in the art for many years. They utilize the property of liquids to absorb gases and to keep them in solution without chemically binding them in the process. How well a gas is absorbed by a liquid is expressed by means of the solubility coefficient. The better the gas dissolves in the liquid, the higher is its solubility coefficient. The solubility coefficient is dependent upon temperature and generally increases with falling temperature.

In order to separate a gas component i from a gas mixture by means of physical scrubbing, a minimum amount of scrubbing medium $W_{min}$ is required and can be calculated very easily by the following formula:

$$W_{min} = V/(p \cdot \lambda i)$$

In the formula, V stands for the overall amount of gas mixture which is to be decomposed, p stands for the pressure which prevails in the gas mixture and $\lambda_i$ stands for the solubility coefficient of the gas component which is to be scrubbed out with regard to the applied scrubbing medium. Under the assumption that the solubility coefficients of the components of a gas mixture differ to a sufficiently large extent, it is possible, by means of a corresponding adjustment of the amount of scrubbing medium, to separate, i.e. to selectively remove, in one scrubbing step those gas components with the highest solubility coefficients largely independently of the remaining gas components. With larger amounts of scrubbing medium, further gas components or groups of gas components with similar solubility coefficients can be selectively scrubbed out in subsequent scrubbing steps according to the same principle.

A known physical gas scrubbing is methanol scrubbing in which liquid methanol at temperatures way below 0° C. is used as scrubbing medium. It is especially used for separating carbon dioxide and sulfur components from raw synthesis gas and therefore to obtain a gas mixture which consists of hydrogen and carbon monoxide. A methanol scrubbing method, in which carbon dioxide and sulfur components are selectively scrubbed out in two consecutive scrubbing steps from a raw synthesis gas containing hydrogen, carbon monoxide and carbon dioxide and also the sulfur components carbon oxide sulfide and hydrogen sulfide, is described in "Gas Separation & Purification", December 1988, Vol 2, p. 171-176. For this, the raw synthesis gas is directed into an absorption column in which a first and a second scrubbing section are arranged one above the other. For separating the carbon dioxide, unladen methanol is used in the second scrubbing section, whereas in the first scrubbing section the sulfur components are scrubbed out with some of the methanol which has already been preladen with carbon dioxide during the carbon dioxide separation. Since the sulfur components in relation to methanol have a solubility coefficient which is higher by a multiple than that of carbon dioxide, only a fraction of the scrubbing medium which is laden with carbon dioxide in the second scrubbing section is required for separation of the sulfur components.

If the gas mixture produced by means of physical gas scrubbing is to be fed to a gas turbine as fuel, removal of the sulfur components which is as complete as possible is to be aimed at since on the one hand these would lead to damage to the gas turbine and on the other hand current emissions standards in the exhaust gas would have to be observed. At the same time, it is desirable to completely leave the carbon dioxide in the gas mixture in the main since it is required as a moderator and working medium in the gas turbine. It is the prior art to purify the raw synthesis gas in a scrubbing step in which the minimum amount of unladen methanol required for separation of the sulfur components is used as scrubbing medium. In this case, the result is a largely sulfur-free gas mixture with considerably reduced carbon dioxide content since in addition to the sulfur components carbon dioxide is also absorbed to a considerable extent by the scrubbing medium. The sulfur-free gas mixture is therefore suitable for use in a gas turbine only to a limited degree.

It is therefore the object of the present invention to disclose a method and also a device of the type described in the introduction by means of which the disadvantages of the prior art are overcome.

This object is achieved on the method side by carbon dioxide being separated from only a partial amount of the desulfurized gas mixture in a second scrubbing section by means of scrubbing with an unladen scrubbing medium and by the scrubbing medium, preladen with carbon dioxide, which is obtained in the process being used totally in the first scrubbing section as scrubbing medium.

If gas and scrubbing medium are directed through the scrubbing sections in counterflow, as is the case for example in an absorption column, a region in which a thermal and physical equilibrium is established for the first time between inflowing scrubbing medium and gas is defined as the limit of the first scrubbing section. Scrubbing medium therefore enters the first scrubbing section if it passes this limit, whereas gas leaves said first scrubbing section.

The amount of scrubbing medium used is expediently selected so that it corresponds to the minimum amount which is required for the complete separation of the sulfur components in the first scrubbing section. The scrubbing medium is preferably preladen in the second scrubbing section to the extent that it can be introduced into the first scrubbing section in a state saturated with carbon dioxide. Since such a scrubbing medium has no capacity, or only very little capacity, for absorbing carbon dioxide, no carbon dioxide, or only very little carbon dioxide, is scrubbed out of the feed gas in the first scrubbing section, as a result of which the desulfurized gas mixture is extracted with a carbon dioxide concentration which in the main corresponds to that of the feed gas. The gas mixture which is not transferred into the second scrubbing section can therefore can be discharged as a sulfur-free product, containing hydrogen and carbon monoxide, with a high carbon dioxide content or can be used for example as fuel for a gas turbine or as methanol synthesis gas.

Possibly, the amount of carbon dioxide contained in the feed gas is of such a high level that as a result of a mere separation of the sulfur components a desulfurized gas mixture is created, of which the carbon dioxide content is too large to be able to use it directly as a product. In such a case, it is expedient to introduce a scrubbing medium which is not completely laden with carbon dioxide into the first scrubbing section so that in addition to sulfur components carbon dioxide is also separated from the feed gas.

During the absorption of the sulfur components in the first scrubbing section, heat of solution is released and on account of the temperature dependency of the solubility coefficient leads to an increase of the required amount of scrubbing medium. Consequently, the preloading of the scrubbing medium which is used in the first scrubbing section is reduced so that in the first scrubbing section more carbon dioxide is absorbed and therefore product gas containing less carbon dioxide is produced. In order to avoid this, an embodiment of the method according to the invention provides that heat of solution is extracted from the scrubbing medium in the first scrubbing section in at least one cooling step. The cooling is preferably carried out so that the scrubbing medium discharges from the first scrubbing section at a temperature which differs by 5° C. at most from the temperature at which it enters the first scrubbing section.

The advantages of the method according to the invention compared with the prior art are then especially great if liquid and deep-frozen methanol is used as scrubbing medium. The method can also be implemented, however, with other scrubbing mediums, such as with dimethyl ether of polyethyleneglycol (known as DMPEG) or N-methyl-2-pyrrolidone (known as NMP).

The economic efficiency of physical gas scrubbing increases with the pressure at which the gas scrubbing is carried out. The scrubbing sections of methanol scrubbing are therefore operated at a pressure of approximately 50 bar so that the gas products which are produced there are at a comparably high pressure. If such a gas product is to be used for example as fuel gas in a gas turbine, then it is necessary to reduce this pressure since fuel gas can be fed to a gas turbine typically only at a pressure of approximately 25 bar. A preferred embodiment of the method according to the invention therefore provides that the part of the desulfurized gas mixture which is not fed to the second scrubbing section is expanded in an expansion turbine, performing work. Cooling of the desulfurized gas mixture also takes place in the process.

In order to utilize the low temperature which is produced during the work-performing expansion of the desulfurized gas mixture, it is proposed that cooled desulfurized gas mixture is used for example for cooling a sulfur-free scrubbing medium flow which is used in scrubbing-medium regeneration for the backwashing of sulfur components.

The invention furthermore relates to a device for separating sulfur components and carbon dioxide from a feed gas containing hydrogen, carbon monoxide, carbon dioxide and also sulfur components by means of physical gas scrubbing, having an absorption column in which a first scrubbing section is arranged beneath a second scrubbing section, wherein the absorption column in its lower region has a gas supply for feeding the feed gas and at its head has a stripping device for the stripping of a gas mixture which is cleaned of sulfur components and carbon dioxide, and also a scrubbing-medium supply for feeding an unladen scrubbing medium into the second scrubbing section.

The set object on the device side is achieved according to the invention by a side-disposed stripping line being arranged between the first scrubbing section and the second stripping section, via which a gas mixture, which is desulfurized in the first scrubbing section, can be stripped.

In order to be able to establish the carbon dioxide content of the preladen scrubbing medium in a directed manner, the invention provides that the scrubbing-medium supply has at least two introduction points arranged at different levels, to which the amount of unladen scrubbing medium can be distributed.

In a development of the invention, it is proposed that it has an expansion turbine which is connected to the side-disposed gas stripping device of the absorption column and in which desulfurized gas mixture can be expanded, performing work.

In the following text, the invention shall be explained in more detail based on an exemplary embodiment which is schematically represented in FIG. 1.

BRIEF DESCRIPTION OF THE DRAWINGS

FIG. 1 shows the absorption column of a physical gas scrubber, in which a fuel gas for a gas turbine is produced from a raw synthesis gas by separating sulfur components.

Via the line 1, a raw synthesis gas containing hydrogen, carbon monoxide, sulfur components and carbon dioxide is introduced into the lower region of the absorption column A, in which the two scrubbing sections W1 and W2 are arranged one above the other. On its path through the absorption column A, the raw synthesis gas first makes its way into the scrubbing section W1, through which it is directed in counterflow to a physically acting scrubbing medium. The scrubbing medium, being methanol, for example, is already preladen with carbon dioxide so that predominantly sulfur components are separated from the raw synthesis gas, whereas carbon dioxide in the main remains completely in the gas phase. In order to dissipate at least some of the heat of solution being released during the absorption of the sulfur components, the scrubbing medium is stripped via the chimney tray K and via the line 2 is directed through the heat exchanger E where it is cooled against external refrigeration. Some of the gas mixture which is desulfurized in the scrubbing section W1, the carbon dioxide concentration of which is basically that of the raw synthesis gas 1, is stripped via the side-disposed gas stripping line 3 and after a work-performing expansion in an expansion turbine is discharged as a product 8 and, for example, fed as fuel gas to a gas turbine. The remaining part of the desulfurized gas mixture makes its way into the second scrubbing section W2 where it is subjected to scrubbing with unladen scrubbing medium 4. In the second scrubbing section W2, the desulfurized gas mixture is freed of carbon dioxide so that a gas mixture largely consisting of hydrogen and carbon monoxide can be stripped from the head of the absorption column A, via the line 5, as a further product. The scrubbing medium which is laden with carbon dioxide in the scrubbing section W2 is transferred completely into the scrubbing section W1 where it is used as scrubbing medium for separating the sulfur components from the raw synthesis gas. The absorption column A is operated so that the scrubbing medium is largely preladen with carbon dioxide in the scrubbing section W2. In order to be able to achieve this consistently, even under fluctuating operating conditions, the amount of scrubbing medium 4 can be distributed with the aid of the control elements a and b to the two lines 6 and 7 and can be introduced into the scrubbing section W2 at different levels.

The invention claimed is:

1. A method for physical gas scrubbing comprising:
 directing a feed gas stream containing hydrogen, carbon monoxide, and carbon dioxide, and also containing at least one of carbon oxide sulfide and hydrogen sulfide, through a first scrubbing section in counterflow to a first scrubbing medium which is preladen with carbon dioxide to selectively separate sulfur components from said feed gas stream and to produce a desulfurized gas mixture stream, and separating carbon dioxide from only a partial quantity of the desulfurized gas mixture stream in a second scrubbing section by scrubbing with an unladen second scrubbing medium and using said second scrubbing medium discharged from said second scrubbing section, preladen with carbon dioxide, in said first scrubbing section as said first scrubbing medium.

2. The method as claimed in claim 1, wherein said first scrubbing medium enters said first scrubbing section in a state saturated with carbon dioxide.

3. The method as claimed in claim 1, further comprising extracting heat of solution from said first scrubbing medium in said first scrubbing section by cooling said first scrubbing medium in at least one cooling step.

4. The method as claimed in claim 3, wherein said first scrubbing medium enters said first scrubbing section at a first temperature, and said cooling of said first scrubbing medium is carried out so that said first scrubbing medium discharges from said first scrubbing section at a temperature which differs by at most 5° C. from said first temperature.

5. The method as claimed in claim 1, further comprising subjecting the part of said desulfurized gas mixture stream which is not fed to said second scrubbing section to work-performing expansion in an expansion turbine.

6. The method as claimed in claim 5, wherein, during said work-performing expansion, said desulfurized gas mixture stream is cooled, and further comprising using the cooled desulfurized gas mixture stream for cooling a sulfur-free scrubbing medium flow which is used during scrubbing-medium regeneration for backwashing of sulfur components.

7. The method as claimed in claim 1, further comprising feeding the part of said desulfurized gas mixture stream which is not fed to said second scrubbing section as fuel to a gas turbine.

8. The method as claimed in claim 1, wherein methanol, dimethyl ether of polyethyleneglycol, or N-methyl-2-pyrrolidone is used as said unladen second scrubbing medium in said second scrubbing section.

9. The method as claimed in claim 1, wherein the part of said desulfurized gas mixture stream which is not fed to said second scrubbing section is fed to a methanol production process.

10. The method as claimed in claim 1, wherein methanol is used as said unladen second scrubbing medium in said second scrubbing section.

11. The method as claimed in claim 1, wherein dimethyl ether of polyethyleneglycol is used as said unladen second scrubbing medium in said second scrubbing section.

12. The method as claimed in claim 1, wherein N-methyl-2-pyrrolidone is used as said unladen second scrubbing medium in said second scrubbing section.

13. The method as claimed in claim 1, wherein said unladen second scrubbing medium is introduced into said second scrubbing section at at least two introduction points arranged at different levels.

* * * * *